US006665765B1

(12) United States Patent
Tang et al.

(10) Patent No.: US 6,665,765 B1
(45) Date of Patent: Dec. 16, 2003

(54) HOT DOCKING DRIVE WEDGE AND PORT REPLICATOR

(75) Inventors: Jeffrey C. Tang, Cypress, TX (US); Gregory N. Santos, Cypress, TX (US); Ronald P. Meyers, Jr., Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/515,566

(22) Filed: Feb. 29, 2000

(51) Int. Cl.[7] ............................................. G06F 13/00
(52) U.S. Cl. ..................... 710/304; 710/10; 710/72; 710/104; 710/112; 710/300; 710/301; 710/302; 710/303
(58) Field of Search ................ 710/303, 10, 304, 710/300, 62, 109; 361/686, 727; 320/113; 439/374

(56) References Cited

U.S. PATENT DOCUMENTS

| 5,186,646 | A | * | 2/1993 | Pederson ..................... 439/374 |
| 5,488,572 | A | * | 1/1996 | Belmont ....................... 710/62 |
| 5,687,387 | A | * | 11/1997 | Endejan et al. ................ 710/2 |
| 5,699,226 | A | * | 12/1997 | Cavello ....................... 361/686 |
| 5,721,836 | A | * | 2/1998 | Scharnberg et al. ......... 710/303 |
| 5,768,541 | A | * | 6/1998 | Pan-Ratzlaff ................ 710/10 |
| 5,781,748 | A | * | 7/1998 | Santos et al. ................ 710/104 |
| 5,805,412 | A | * | 9/1998 | Yanagisawa et al. ....... 361/686 |
| 5,873,000 | A | * | 2/1999 | Lin et al. ....................... 710/72 |
| 5,933,609 | A | * | 8/1999 | Walker et al. ............... 710/304 |
| 5,991,833 | A | * | 11/1999 | Wandler et al. ............. 710/112 |
| 6,040,681 | A | * | 3/2000 | May ............................ 320/113 |
| 6,161,157 | A | * | 12/2000 | Tripathi et al. .............. 710/109 |
| 6,195,718 | B1 | * | 2/2001 | Hennessy et al. ........... 710/304 |
| 6,208,508 | B1 | * | 3/2001 | Ruch et al. .................. 361/686 |
| 6,222,728 | B1 | * | 4/2001 | Jaggers et al. ............... 361/686 |
| 6,236,571 | B1 | * | 5/2001 | Dohi et al. ................... 361/727 |
| 6,407,915 | B1 | * | 6/2002 | Derocher et al. ........... 361/686 |
| 6,460,106 | B1 | * | 10/2002 | Stufflebeam ................ 710/304 |
| 6,493,782 | B1 | * | 12/2002 | Verdun et al. ............... 710/300 |

FOREIGN PATENT DOCUMENTS

JP                08/926394           * 9/1997            ............. G06F/3/00

OTHER PUBLICATIONS

M. Morris Mano, Computer System Architecture, 1982, Prentice–Hall, Inc., second edition, pp. 124–125.*
Wilfred, Generic 4 port USB Hub, May 1999, Hardware One, http://www.hardware-one.com/reviews.asp?aid=60&page=1.*
M. Morris Mano, Computer System Architecture, 1982, Prentice–Hall, Inc., second edition, pp. 124–125.*

* cited by examiner

*Primary Examiner*—Gopal C. Ray
*Assistant Examiner*—Justin King (57) ABSTRACT

A portable computer can be "hot" docked to one or more expansion devices, such as a drive wedge and a port replicator. As such, the expansion devices can be connected to and disconnected from the portable computer while portable computer is powered on and fully operational. The portable computer includes control logic that detects when an expansion device is connected to or disconnected from the portable computer and asserts an SMI or equivalent interrupt signal to the computer's CPU to initiate a sequence of events by which the computer determines whether an expansion device has been connected or disconnected. If the CPU determines that the expansion device has been connected to the computer, the CPU appropriately reconfigures itself to communicate with the expansion device. If the expansion device is disconnected, the CPU also appropriately reconfigures itself to preclude communications with the disconnected device.

3 Claims, 5 Drawing Sheets

HOT DOCKING DRIVE WEDGE AND PORT REPLICATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to portable computers. More particularly, the invention relates to connecting a portable computer to a drive wedge and a port replicator. Still more particularly, the present invention relates to docking and undocking a portable computer to a drive wedge and port replicator while the computer is powered on.

2. Background of the Invention

Portable computers, such as laptops, notebooks, sub-notebooks and the like, generally provide the performance and functionality of a desktop computer, but with advantage of portability. Smaller size and lower weight are achieved by making various design tradeoffs such as including a smaller size screen and keyboard in a portable computer versus a comparable desktop.

Some portable computer users desire to use a portable computer for extended periods of time. For example, for some it is desirable to use a portable computer at work and then bring the computer home for use at night. Because of the relatively small screen and keyboard sizes, some people find portable computers less than optimal for using in an office or home environment for extended periods of time, during which time portability is irrelevant.

To solve this problem, computer manufacturers offer various types of connection equipment that permit a portable computer to connect easily to various desktop peripheral devices. One type of connection device is a "port replicator" which is an electronic device positionable on the desktop or other work surface. The replicator serves as an interface between the portable computer and the various desktop peripherals with which it is to be used. A port replicator typically includes a housing having a rear panel with various connectors accessible from the rear of the replicator. A series of interconnection cables connect the selected peripheral equipment to the connectors on the rear panel of the port replicator. The replicator also includes a front portion that has one or more connectors which matingly engage corresponding connector(s) on a rear panel of the portable computer when the computer is placed on the desktop and pushed against the port replicator. The connectors on the rear panel of the replicator are wired to the connector(s) on the front of the replicator to which the computer connects, thereby providing electrical connection between the portable computer and the various peripheral devices. A port replicator usually remains on the desktop connected to the various peripheral devices and the portable computer is connected to or disconnected from the replicator as the user desires, thereby avoiding the hassle of connecting various peripheral devices each time the portable computer is to be used with such devices.

At least one manufacturer also provides a drive "wedge" that contains one or more storage devices such as a CD ROM, DVD drive, floppy drive, CD read/write drives and LS-120 drive. A drive wedge offered by Compaq Computer Corp., for example, is a relatively flat device that engages the bottom surface of a Compaq portable computer by way of a single connector. The wedge includes another connector that permits the computer/wedge combination to mate to a port replicator. By providing various storage devices (e.g., floppy drive) in the detachable wedge, the portable need only contain a hard drive, and as such, is relatively thin and lightweight. Accordingly, when a floppy drive and CD ROM are not needed, the user is able to use a computer that is smaller and lighter weight than it would otherwise be with such peripheral devices.

The process of connecting the portable computer to a wedge and/or a port replicator is often referred to as "docking." The reverse process of disconnecting these components is called "undocking." In conventional computer systems, docking and undocking required the computer to be completely off before docking or undocking. Thus, if the portable computer was already booted up and running, the user first had to turn the computer off, then dock it to the port replicator, and then reboot the computer. This order was necessary to ensure that the computer and its operating system knew what peripheral devices were available for use, information which was only obtained during the Power On Self Test ("POST") process during boot up. More recently, with the advent of portable computers that implement the Advanced Configuration and Power Interface ("ACPI") or Advanced Power Management ("APM") standards which permit a computer to efficiently transition to a lower power mode of operation (commonly referred to as a "sleep" mode), portables need not be completely shut down before docking or undocking. Instead, the computer could be transitioned to a "sleep" mode and then docked or undocked. Sleep modes are lower power modes in which various subsystems in the computer are turned off to save power. Waking a computer from a sleep mode is a much faster process than cold booting the computer that was completely shut down, and thus docking/undocking a computer by putting the computer to sleep permits the computer to resume normal operation following the dock event much quicker. Upon resuming from sleep, the computer's Basic Input Output System ("BIOS") and operating system coordinate to re-detect attached peripheral devices.

It would be better still to be able to "hot dock" a computer. Hot docking means docking or undocking a portable computer from a connection device, such as port replicator, while the computer is and remains fully operational. Hot docking thus would not require the portable computer from being turned off or even placed into a sleep mode. A computer that can be hot docked thus would further minimize the hassle experienced by some users of conventional computers.

BRIEF SUMMARY OF THE INVENTION

The problems noted above are solved in large part by a portable computer that can be "hot" docked to one or more expansion devices. As such, the expansion devices can be connected to and disconnected from the portable computer while portable computer is powered on and fully operational. The portable computer includes control logic that detects when an expansion device is connected or disconnected and asserts an interrupt to the computer's CPU to initiate a sequence of events by which the computer determines whether an expansion device has been connected or disconnected. If the CPU determines that the expansion device has been connected to the computer, the CPU appropriately reconfigures itself to communicate with the expansion device. If the expansion device is disconnected, the CPU also appropriately reconfigures itself to preclude communications with the disconnected device.

In accordance with a preferred embodiment of the invention, the portable computer can be hot docked to a drive wedge (and hot un-docked therefrom) which may contain one or more storage devices. The portable computer/drive wedge combination, in turn, can be hot docked to a port replicator (and hot un-docked therefrom).

In accordance with a preferred embodiment, the port replicator contains an analog portion of a network interface and the portable computer contains the corresponding digital portion of the network interface. The full network interface capability, therefore, is not available unless the portable computer is docked to the port replicator. To prevent the digital network interface portion in the portable computer from attempting to operate without the analog portion being available and used when the portable is not docked to the port replicator, the configuration select input signal to the digital network interface portion is masked by a signal that indicates whether the port replicator is docked. Preferably, masking of the configuration select input signal is provided by an AND gate connected to the digital network interface portion.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
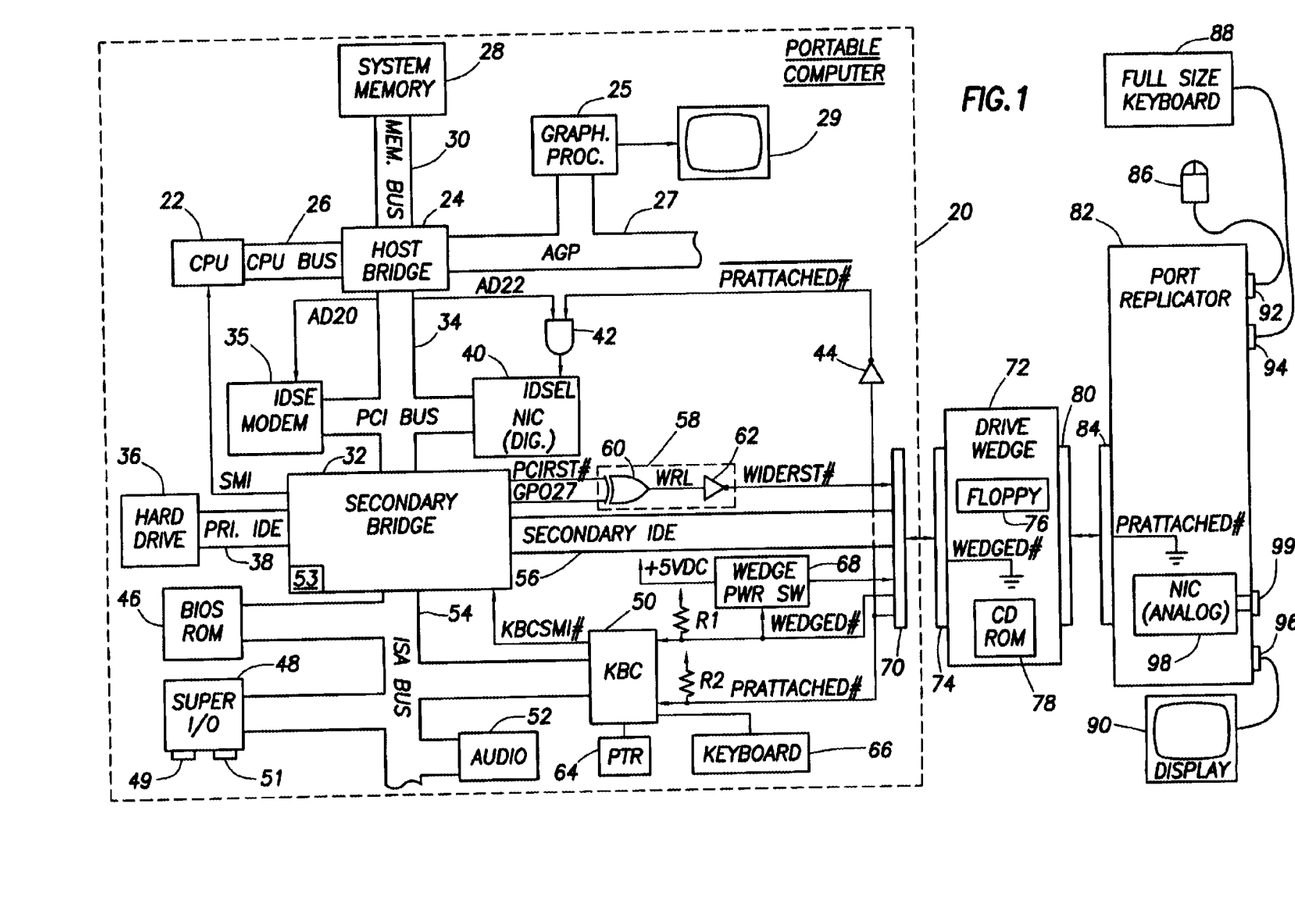
FIG. 1 shows a computer system implementing hot docking and constructed in accordance with a preferred embodiment of the present invention.

Referring now to FIG. 1, computer system 20, constructed in accordance with the preferred embodiment, comprises a portable computer such as a laptop or notebook or any other type of portable computing device. Computer system 20 may include the various types of hand held computing devices. In this disclosure, computer system 20 will be referred to as a "portable" for sake of convenience.

As shown, portable 20 includes a central processing unit ("CPU") 22 coupled to a host bridge logic device 24 over a CPU bus 26. CPU 22 may include any processor suitable for a laptop, such as a Pentium class processor provided by Intel. The host bridge 24 couples together various busses and devices connected to such busses. A system memory 28, which preferably is one or more synchronous dynamic random access memory ("SDRAM") devices (or other suitable type of memory device), couples to host bridge 24 via a memory bus 30. Further, a graphics processor 25, which provides video and graphics signals to a built-in display 29, couples to host bridge 24 by way of a suitable graphics bus, such as the Advanced Graphics Port ("AGP") bus 27. Host bridge 24 also couples to a peripheral or system bus 34. In the preferred embodiment shown in FIG. 1, peripheral bus 34 is a Peripheral Component Interconnect ("PCI") bus.

Various peripheral devices can be included in portable 20 and connected to PCI bus 34. Such peripheral devices may include a modem 35 and a network interface card ("NIC") 40 and other devices not shown.

As such, host bridge 24 couples together CPU 22, system memory 28, graphics processor 25, and one or more devices coupled to PCI bus 34 by bridging CPU bus 26, memory bus 30, AGP bus 27, and PCI bus 34. The host bridge 24 permits the CPU 22 to read data from or write data to system memory 28. Further, through host bridge 24, the CPU 22 can communicate with PCI devices 35 and 40, and similarly, PCI devices 35 and 40 can read data from and write data to system memory 28 via the host bridge 24. The host bridge preferably contains memory controller and arbiter logic (not specifically shown) to provide controlled and efficient access to system memory 28 by the various devices in portable 20 such as CPU 22 and the various PCI devices. A suitable host bridge is the 82443BX Host Bridge/Controller provided by Intel and described in the Intel® 440BX AGPset: 82443BX Host Bridge/Controller datasheet dated April, 1998 which is incorporated herein by reference in its entirety.

Referring still to FIG. 1, portable computer 20 also includes a secondary bridge logic device 32 coupled to the PCI bus 34. The secondary bridge 32 preferably is a 82371AB PCI-to-ISA/IDE XCELERATOR (PIIX4) device provided by Intel and described in the 82371AB PCI-to-ISA/IDE XCELERATOR data sheet incorporated herein by reference in its entirety. Secondary bridge logic device 32 preferably includes a non-volatile random access memory ("NVRAM") 53 in which various parameters can be stored and retrieved. At least one of the locations is used to indicate whether the drive wedge and/or port replicator is docked to the portable. As shown, the secondary bridge 32 preferably also includes a primary Integrated Drive Electronics ("IDE") bus 38 coupled to a hard drive 36. Secondary bridge 32 also provides support for a secondary IDE bus 56 and an Industry Standard Architecture ("ISA") bus 54. A Basic Input/Output System Read Only Memory ("BIOS ROM") device 46, a super I/O device 48, an audio subsystem 52, and a keyboard controller 50 couple to secondary bridge 32 via the ISA bus 54.

The BIOS ROM includes firmware that is executed by the CPU 22 and which provides low level functions, such as access to the hard drive 36. The BIOS firmware also contains the instructions executed by CPU 22 to conduct the POST of portable 20. During the boot up process, the BIOS is copied to system memory 28 to permit faster access by CPU 22.

The super I/O device 48, which preferably is a PC97338VJG Super I/O provided by National Semiconductor, provides various input and output functions. For example, the super I/O device 48 includes a serial port 49 and a parallel port 51 for connecting peripheral devices that communicate over a serial line or a parallel pathway.

The audio subsystem 52 preferably is a NMA2 manufactured by Neomagic Corp. and provides digital and analog processing and provides connection to one or more speakers (not shown).

The keyboard controller 50 preferably is an H8 controller manufactured by Hitachi. In addition to providing support for keyboard 66, keyboard controller 50 receives input from pointing device 64 (e.g., a capacitive touchpad). The keyboard controller 50 processes input signals from the keyboard 66 and pointer 64 and provides that information to the CPU 22 via the ISA bus 54, secondary bridge 32, PCI bus 34, host bridge 24 and CPU bus 26 so that the CPU 22 can respond to the input signals as is deemed appropriate (e.g., displaying an alphanumeric character on the display 29 after that character has pressed on keyboard 66).

Portable 22 also includes an AND gate 42, inverter 44, wedge reset logic 58 ("WRL") (preferably comprising XOR gate 60 following by inverter 62), wedge power switch 68, and pull-up resistors R1 and R2 connected to signals WEDGED# and PRATTACHED#, respectively. The functions performed by these components relate to the ability of portable 20 to be hot docked and will explained thoroughly below. One of ordinary skill in the art will recognize that portable 20 may, and likely will, include other components, such as a battery, not shown in FIG. 1.

The present invention is directed to "hot docking" a computer to one or more expansion devices. The preferred embodiment of the invention illustrates the principles with regard to a portable docking to a drive wedge and a port replicator. This embodiment should not be used to limit the scope of the claims unless so indicated by the language of the claims themselves.

Portable 20 is designed to dock to drive wedge 72. Drive wedge 72 may include a floppy drive 76, a CD ROM drive 78, or other suitable types of drives such as an LS-120 and DVD drive. By including various types of storage devices in drive wedge 72 instead of portable 20, portable 20 is thinner and lighter than it otherwise would be with such storage devices included in portable 20. Thus, if the user does not need a floppy drive or CD ROM or other such type of storage device, the wedge 72 can be excluded and the user is able to use the small and light weight portable 20.

If the various storage devices are needed, the drive wedge 72 can be attached to the portable 20. Further, portable 20 can be hot docked to drive wedge 72. That is drive wedge 72 can be connected to portable 20 while portable 20 is powered on and fully operational. Electrical connectivity between drives 76, 78 in drive wedge 72 and portable 20 is completed through connectors 70, 74 and secondary IDE bus 56. Although mechanical drawings of the portable and drive wedge are not shown, the drive wedge connects to the portable on the bottom surface of the portable. The drive wedge 72 also can be undocked from portable 20 while the system is powered on and fully operational. Once the drive wedge 72 is docked to the portable 20, the portable/wedge combination can be docked to port replicator 82 while the system is powered on and fully operational. The reverse process of undocking the portable/wedge combination from the port replicator also can be performed while the system is fully operational. FIGS. 2–5 show the preferred sequence of events for accomplishing hot docking and undocking.

Figure 2:
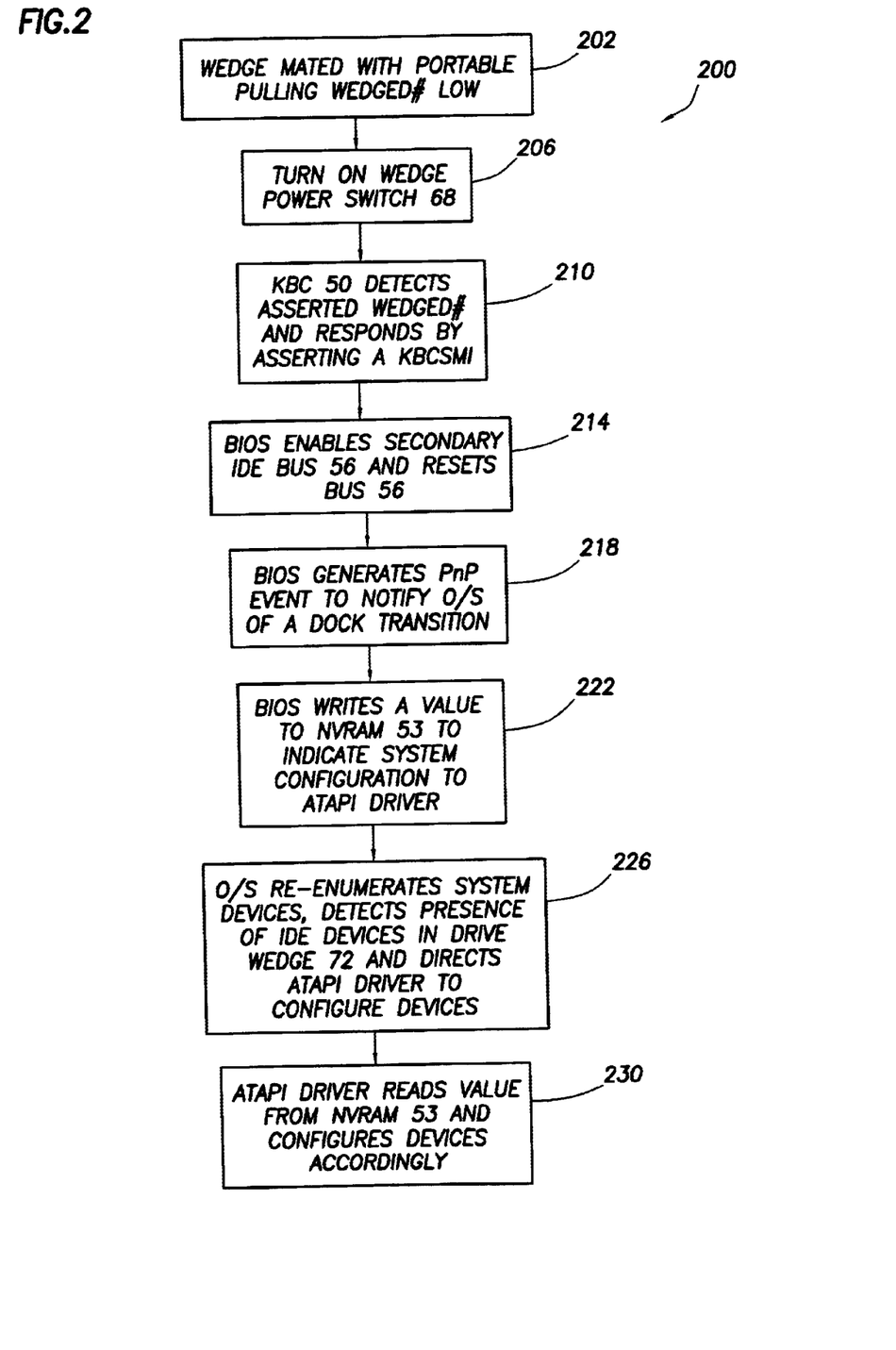
FIG. 2 is a flow chart of the preferred actions to hot dock a fully operational portable computer to the drive wedge of FIG. 1.

Referring to FIG. 2, which should be reviewed in combination with the system schematic of FIG. 1, sequence 200 shows the preferred steps for hot docking portable 20 to drive wedge 72; that is, connecting an active, fully operational portable to the wedge. Sequence 200 includes steps 202–230 which do not necessarily have to performed in the order shown.

Figure 3:
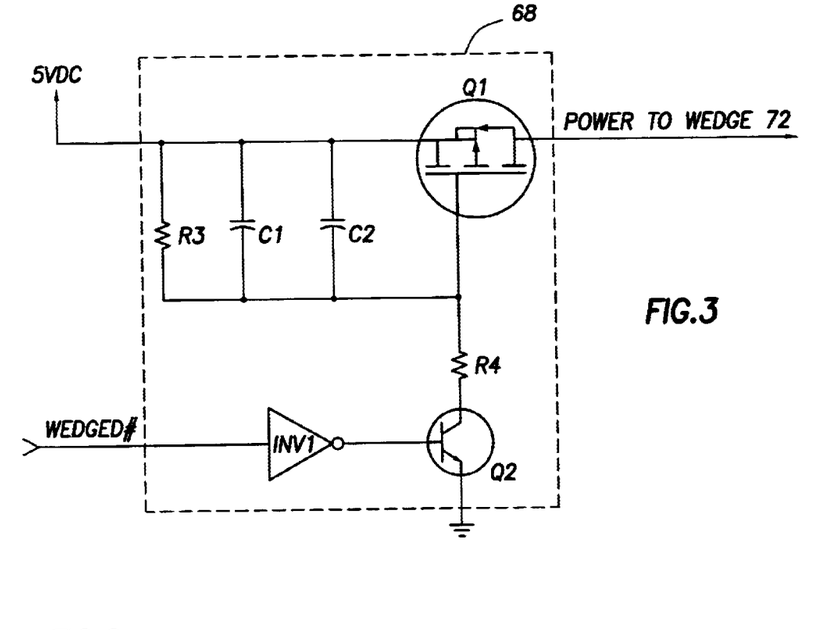
FIG. 3 shows a preferred embodiment of a wedge power switch shown in FIG. 1.

In step 202, the wedge 72 is mated with portable 20. As shown in FIG. 1, drive wedge 72 includes a signal labeled WEDGED# which is hard wired to the logic low state. This signal is provided to wedge connector 74 and, when wedge 72 is connected to portable 20, is provided through portable connector 70 to KBC 50 and wedge power switch 68. Wedge power switch 68 preferably is a solid state switch that is turned on and off by the WEDGED# signal. When on, wedge power switch 68 provides 5V DC power (or other suitable voltage levels) from portable 20 through connectors 70 and 74 to wedge 72 to power devices 76, 78. Accordingly, when the portable 20 is mated to the wedge 72, the WEDGED# input signal to the wedge power switch 68 is pulled low causing power to flow to the wedge 72.

referring briefly to FIG. 3, wedge power switch 68 preferably comprises resistors R3, R4, capacitors C1, C2, inverter INV1, and transistors Q1, Q2. Inverter INV1 accommodates the active low signal WEDGED# to be the control signal for the wedge power switch 68 and, specifically, to turn on transistor Q2. The combination of resistor R3, C1, C2 provide low pass filtering to condition the 5 V DC power to the wedge 72. One of ordinary skill in the art will recognize that there are numerous other ways to implement such a switch and the claims which follow should not be limited to the particular embodiment shown in FIG. 3.

Referring again to FIGS. 1 and 2, in portable 20 pull-up resistor R1 maintains WEDGED# at a high level when portable 20 is powered on and not docked to wedge 72. However, when wedge 72 is connected to portable 20 (step 202), the WEDGED# input pin to the KBC 50 transitions from the high to low state. The KBC 50 detects this high to low transition in step 210 and responds by asserting a KBC system management interrupt (KBC SMI#) to secondary bridge 32. If secondary bridge 32 comprises a PIIX4 bridge, the KBC SMI# signal is provided to the EXTSMI# input pin of the PIIX4 which responds to the asserted EXTSMI# pin by asserting the SMI output signal to the CPU 22. The SMI is one of the highest priority interrupts in the system. The CPU responds to the asserted SMI by executing a predetermined section of BIOS code, which is loaded into system memory 28 during boot up. In accordance with known techniques the BIOS code determines the source of the SMI as being the KBC 50 and determines that the wedge 72 has been connected to portable 20. The BIOS code determines the source of the SMI by querying predetermined I/O and memory resources that indicate sources of SMI such as various status registers in the secondary bridge 32. This may include multiple SMI sources like docking, panel brightness, system temperature or battery status.

In step 214, the BIOS code enables the secondary IDE bus 56, which up to now has been maintained in a tri-state (i.e., high impedance) condition. Step 214 is performed in any suitable manner given the choice of parts selected for the computer system. For example, if the secondary bridge 32 is an Intel PIIX4 bridge device, step 214 is performed by setting bit 12 of PIIX4's General Configuration Register (Function 0) to a logic 0 which enables the secondary IDE bus 56. (Tristating bus 56 is accomplished by setting bit 12 to a logic 1). Also about this time, the secondary bridge 32 also asserts a general purpose output signal (GPO27 in the preferred embodiment of FIG. 1) which causes the wedge IDE reset signal (WIDERST#) to be asserted low forcing the IDE devices in the wedge 72 to reset. Resetting the secondary IDE bus devices after power is supplied may be necessary for the proper detection and operation of the IDE devices in the wedge. As is commonly known, the PCI reset signal (PCIRST#) is asserted during initialization to reset devices in the system. The PCIRST# signal is XOR'd with GPO27 to insure that the wedge devices 76, 78 are reset both during initialization and during a hot dock.

With the secondary IDE bus 56 enabled, the BIOS code then generates a Plug-n-Play ("PnP") event, which is a known feature of the Windows 98 operating system (or equivalent event if other operating systems are used). The PnP event generated in step 218 notifies the operating system of a dock transition, that is, a device has been added to the computer system while the computer system is on and fully operational. It should be recognized that the portable 20 preferably includes an operating system that has plug-and-play capabilities.

In step 222, the BIOS code writes a predetermined value to NVRAM 53 to indicate the system configuration to the ATAPI driver which controls the drives in the wedge 72. The predetermined value can be any desired value to indicate to the ATAPI driver that portable 20 has been docked to the drive wedge 71. In accordance with the preferred embodiment of the invention, the value is 01h ("h" indicates the preceding number is a hexadecimal value). This value preferably is written to memory location 7Fh, bank 2.

In step 226, in response to the PnP event notification, the operating system re-enumerates the system devices which means the operating system determines what devices are now present and available in the system and allocates resources (e.g., memory) accordingly. In particular, the re-enumeration performed by the operating system detects the presence of the IDE storage devices in drive wedge 72 and then directs the ATAPI driver to configure the drive wedge devices. In step 230, the ATAPI driver reads the value from NVRAM 53 and configures the drive wedge devices accordingly.

At this point, the portable 20 has been successfully docked to the drive wedge 72 while the portable is on and fully functional. Whatever device or devices are present in the drive wedge are now available for use by the portable 20. The portable did not have to be turned off or placed into a low power mode to complete the dock.

Figure 4:
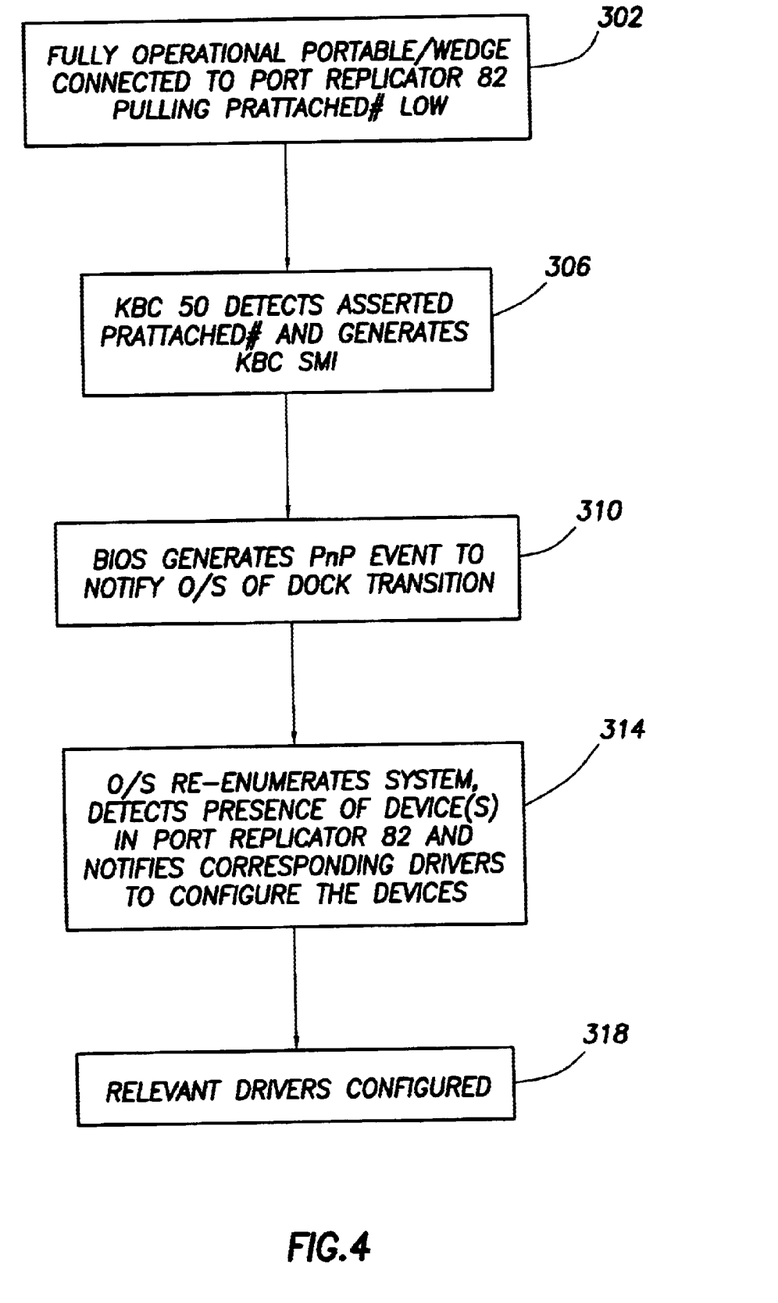
FIG. 4 is a flow chart of the preferred actions to hot dock a portable computer/drive wedge combination to the port replicator of FIG. 1.

Once the portable 20 is successfully docked to the drive wedge 72, the combination of portable and drive wedge can then be docked to the port replicator. FIG. 4 shows the preferred sequence of actions to dock portable 20 already docked to drive wedge 72 to the port replicator 82. Referring to FIGS. 1 and 4, in step 302 the fully operational portable/drive wedge combination is physically connected to the port replicator 82. As can be seen in FIG. 1, the PRATTACHED# signal provided to KBC 50 is normally pulled high through pull-up resistor R2. PRATTACHED# inside the port replicator, however, is tied low. Thus, upon connecting the portable/wedge combination to the port replicator, the PRATTACHED# signal transitions from the high state to the low state as an input signal to KBC 50.

In step 306, the KBC 50 detects the high to low transition of PRATTACHED# and generates a KBC SMI to the secondary bridge 32. The secondary bridge 32 in turn generates an SMI to CPU 22 which responds by executing a predetermined portion of BIOS code (i.e., System Management Mode handler). The BIOS code in step 310 determines the source of the SMI as being the KBC 50, determines that the portable/wedge have been docked to the port replicator 82, and generates a PnP event to notify the operating system of a dock transition.

In step 314, the operating system re-enumerates the system during which it detects the presence of devices in the port replicator 82 (e.g., the NIC (analog) 98, see below) and notifies the corresponding drivers to configure the devices accordingly (step 318). At this point, the portable and wedge have been hot docked to the port replicator without having to have first turned off the computer or place the computer in a low power state to complete the dock.

Figure 5:
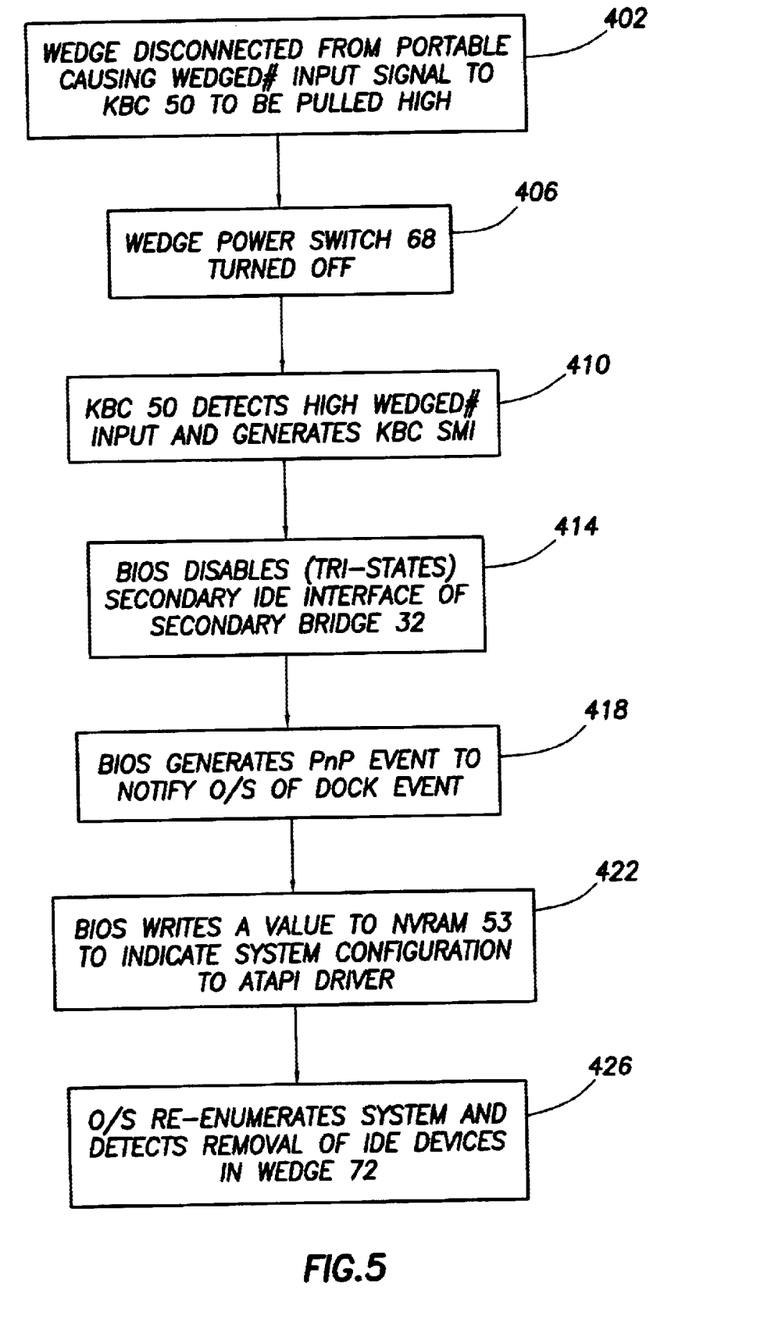
FIG. 5 is a flow chart of the preferred actions to undock a fully operational portable computer from the drive wedge of FIG. 1.

The series of actions in FIG. 5 represent those actions that preferably are performed to undock the drive wedge 72 from a fully operational portable 20. This scenario assumes that the port replicator 82 is not connected. In step 402, the drive wedge 72 is physically disconnected from portable 20, thereby causing the WEDGED# input signal to KBC 50 to transition from the low to high state. A high WEDGED# signal causes wedge power switch 68 to turn off power to the drive wedge (step 406). In step 410, KBC 50 detects the transition of WEDGED# signal from low to high and, in response, generates the KBC SMI# signal to the secondary bridge 32 which, in turn, generates and SMI to CPU 22.

CPU 22 executes BIOS code in response to the SMI to determine the source of the SMI. The BIOS code determines that source of the SMI is the KBC 50 and, in particular, that the portable 20 has been undocked from the drive wedge 72. The BIOS code in step 414 disables (i.e., tri-states) the interface in the secondary bridge 32 to the secondary IDE bus 56 by setting bit 12 of the secondary bridge 32 (assuming it is a PIIX4) to a logic 1. The BIOS code also generates a PnP event in step 418 to notify the operating system of that a dock event has occurred. In step 422, the BIOS code writes a predetermined value to NVRAM 53 to indicate the system configuration to the ATAPI driver. In accordance with the preferred embodiment of the invention, this predetermined value is 00h and is written to location 7Fh, bank 2. Finally, in step 426, the operating system re-enumerates the system and detects that the IDE devices in the drive wedge 72 have been removed. The operating system thus will preclude any future attempts to access the removed devices.

Figure 6:
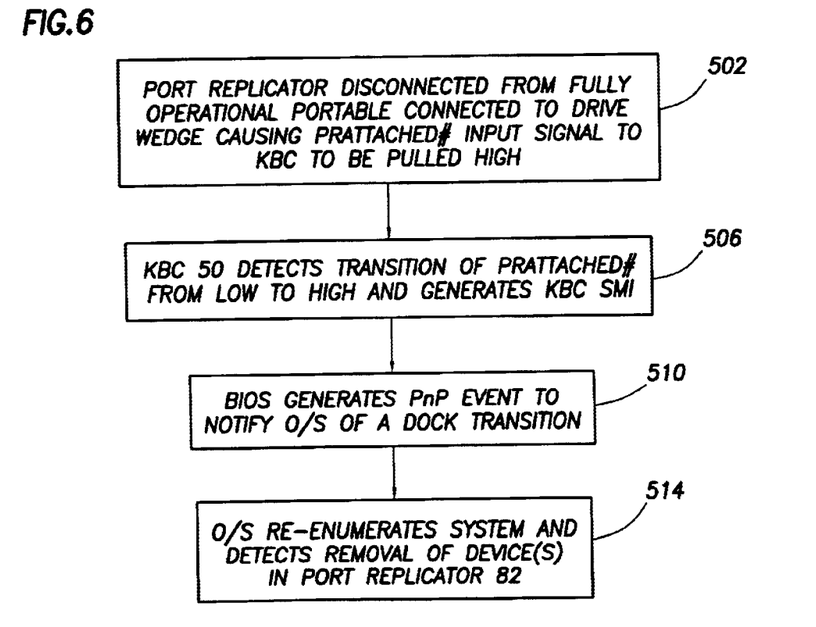
FIG. 6 is a flow chart of the preferred actions to undock a fully operational portable computer/drive wedge combination from the port replicator of FIG. 1.

FIG. 6 includes the preferred series of actions to disconnect a port replicator 82 from a portable 20 docked to a drive wedge 72 while the portable and drive wedge remain fully operational. In step 502, the port replicator 82 is physically disconnected from the portable/drive wedge thereby causing the PRATTACHED# input signal to KBC 50 to transition from the low to high state. In step 506, the KBC 50 detects this transition and generates an appropriate KBC SMI# to the secondary bridge 32 to indicate that the port replicator 82 has been disconnected. After the secondary bridge 32 generates an SMI to CPU 22, the CPU executes BIOS code to isolate the source of the SMI. The BIOS code determines the source of the SMI to be the KBC 50 and further determines that the system has been undocked from the port replicator 82.

In step 510, the BIOS code generates a PnP event to notify the operating system that a dock transition has occurred and in step 514, the operating system re-enumerates the system and detects the removal of the NIC in the port replicator 82 and unloads the drivers associated with the NIC.

The preferred sequence of actions in FIGS. 2 and 4 can also be used to, or readily modified to use to, dock a portable 20 to a drive wedge 72 that has already been connected to a port replicator 82. In this case, both the WEDGED# and PRATTACHED# signals are pulled low at substantially the same time and the KBC 50 detects these transitions. Also, the wedge power switch 68 will turn on power to the drive wedge 72. An SMI is generated to indicate the dock event and the BIOS code responds by generating a PnP for the operating system to re-enumerate the system. The re-enumeration process will detect the presence of both the drive wedge 72 and the port replicator 82.

The preferred sequence of actions in FIGS. 5 and 6 can also be used to, or readily be modified to use to, undock a portable 20 from both a drive wedge 72 and a port replicator 82 by simply disconnecting connectors 70 and 74. Both the WEDGED# and PRATTACHED# signals will be pulled high. A high WEDGED# signal will shut off power to the drive wedge 72 and the KBC 50 will detect a change in the logic state of both signals. Following an asserted SMI, the BIOS code will disable the secondary IDE bus 56 and generate a PnP event. The operating system preferably will respond by re-enumerating the system and detecting the removal of the drive wedge 72 and port replicator 82.

Referring to FIG. 1, in one embodiment of the present invention, the portable 20 and port replicator may have separate components of a NIC to provide network access for the portable when docked to a port replicator. As shown, the digital portion 40 of the NIC, which may be the 21443 manufactured by Intel, preferably includes the digital processing and logic common to NIC's. The analog circuitry necessary for a NIC is included in the port replicator as component 98 and preferably is a ST10040 manufactured by Level One. For the system as shown in FIG. 1 to provide network access, the portable 20 must be docked to the port replicator 82 through the drive wedge 72, thereby providing both the digital and analog portions 40, 98 of the NIC.

Without the portable 20 being docked to the port replicator 82, the digital NIC portion 40 is useless. As shown, digital NIC portion 40 is connected to the PCI bus 34. An aspect of PCI bus operation is the configuration cycle. When the portable 20 boots up or re-enumerates, PCI configuration cycles are run which permit the system to determine which, if any, PCI devices are present in the system. In accordance with the PCI bus requirements, all PCI-compatible devices are required to have configuration registers that can be accessed during a configuration cycle.

A PCI device must include an Initialization Device Select ("IDSEL") input signal. The IDSEL input is used as a chip select during configuration read and write transactions. Thus, when the CPU reads configuration information from a PCI device or writes configuration to a PCI device, the IDSEL input of the target PCI device must be asserted. In accordance with the preferred embodiment of the invention, a separate address line ("AD") is tied to the IDSEL input of each PCI device (e.g., modem 35 and NIC (digital) 40 in FIG. 1). AD22 preferably is coupled to the IDSEL input pin of the digital portion 40 of the NIC. Thus, by asserting AD22 during a PCI bus configuration cycle, NIC (digital) 40 will respond accordingly.

Without the portable 20 being docked to a port replicator 82, thereby providing the analog portion 98 of the NIC, running read and write configuration cycles to the NIC (digital) generally is pointless and can even lead to a system lockup if portable 20 believes a fully operational NIC is present in the system. To avoid this problem, AND gate 42 and inverter 44 are provided to hide the NIC (digital) 40 during PCI bus configuration cycles when portable 20 is not docked to a port replicator 82.

A low state for the PRATTACHED# signal indicates that a port replicator is present; a high indicates a port replicator (and of course the NIC (analog) 98) is not present. By inverting the PRATTACHED# signal, a high output level from inverter 44 indicates a port replicator is present, while a low indicates portable 20 is not docked to a port replicator. Accordingly, the AND gate 42 prevents the IDSEL input to the NIC (digital) 40 from being asserted unless, not only is a PCI configuration cycle trying to run to NIC (digital) 40, but also a port replicator 82 is docked to portable 20. When a port replicator 82 is present, PRATTACHED# is low and the output signal from inverter 44 goes high thereby permitting the AND gate 42 to assert high the IDSEL signal to the NIC (digital) 40 when AD22 is asserted.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A portable computer that can be docked to a drive wedge and a port replicator while the portable computer is on and fully functional, comprising:

a CPU;

a host bridge coupled to said CPU;

a secondary bridge device coupled to said CPU over a system bus;

a control logic coupled to said secondary bridge device over an expansion bus, said control logic receiving WEDGED# input signal that indicates whether the drive wedge is docked to the portable computer and a PRATTACHED# input signal that indicates whether the port replicator is docked to the portable computer, both the WEDGED# and PRATTACHED# input signals connected to pull-up resistors that forces the WEDGED# and PRATTACHED# input signals to the control logic to be in the logic high state when the drive wedge and port replicator are not docked to the portable computer;

code executed by said CPU following either or both of the WEDGED# and PRATTACHED# input signals driven to the logic low state upon detecting docking the portable computer to the drive wedge or port replicator, said code reconfigures the portable computer to permit communications with the drive wedge or port replicator when docked to the portable computer, wherein said drive wedge can be docked to said portable computer while said portable computer is on and fully operational and the docked combination of said drive wedge and portable computer can be docked to said port replicator while said portable computer is on and fully operational; and the portable computer further comprising a digital portion of a network interface card coupled to the system bus, said digital portion including an initialization device select input pin that permits the digital portion to be configured, and an AND gate whose output signal couples to the initialization device select input pin and having an input pin that couples to an address line of said system bus and another input pin coupling to the PRATTACHED# input signal to the control logic, whereby for said digital portion to be configured, said address line must be asserted and said PRATTACHED# must be low indicating that the port replicator has been docked to the portable computer.

2. A method of hot docking a computer to expansion equipment, comprising:

connecting a drive wedge to said computer while said computer is on and fully operational, said drive wedge containing at least one storage devices;

switching on power to said drive wedge;

detecting a transition of a signal from said drive wedge indicating that the drive wedge has been connected to said computer;

enabling a data bus that electrically couples the computer to the drive wedge;

connecting a port replicator to said drive wedge while said computer and said drive wedge are on an fully operational; and detecting a transition of a signal from said port replicator indicating that the port replicator has been coupled to said computer;

wherein said computer includes a configurable digital portion of a network interface card and the port replicator includes an analog portion of the network Interface card and said method further includes masking a configuration select input signal to said digital portion to prevent the digital portion from responding to a configuration request when the port replicator is not coupled to the computer.

3. The method of claim 2 further including unmasking the configuration select input signal to said digital portion to permit the digital portion to respond to a configuration request when the port replicator is coupled to the computer.

* * * * *